United States Patent
Hagiwara et al.

(10) Patent No.: US 11,110,615 B2
(45) Date of Patent: Sep. 7, 2021

(54) ROBOT HAND, ROBOT, AND METHOD FOR ADJUSTING HAND WIDTH OF ROBOT HAND

(71) Applicant: Fanuc Corporation, Yamanashi (JP)

(72) Inventors: Takanori Hagiwara, Yamanashi (JP); Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 353 days.

(21) Appl. No.: 16/262,456

(22) Filed: Jan. 30, 2019

(65) Prior Publication Data
US 2019/0263006 A1 Aug. 29, 2019

(30) Foreign Application Priority Data
Feb. 26, 2018 (JP) .............................. JP2018-031661

(51) Int. Cl.
*B25J 15/10* (2006.01)
*B25J 17/02* (2006.01)
*B25J 9/00* (2006.01)
*B25J 9/16* (2006.01)

(52) U.S. Cl.
CPC ............. *B25J 15/10* (2013.01); *B25J 9/0009* (2013.01); *B25J 9/1664* (2013.01); *B25J 17/0241* (2013.01)

(58) Field of Classification Search
CPC ...... B25J 15/10; B25J 17/0241; B25J 9/0009; B25J 9/1664; B25J 15/0014; B25J 15/0253; B25J 15/0616; B25J 15/0061; B25J 15/0625; B25J 15/0028
See application file for complete search history.

(56) References Cited

U.S. PATENT DOCUMENTS

| | | | |
|---|---|---|---|
| 2002/0003353 A1 | 1/2002 | Massow | |
| 2006/0263270 A1* | 11/2006 | Rizzotte | B25J 15/0253 422/400 |

FOREIGN PATENT DOCUMENTS

| | | |
|---|---|---|
| JP | S60-186386 A | 9/1985 |
| JP | H04-075890 A | 3/1992 |
| JP | H11-216695 A | 8/1999 |
| JP | 2000-167791 A | 6/2000 |

(Continued)

OTHER PUBLICATIONS

Sadamitsu, Daiki; Notice of Reasons for Refusal for Japanese Patent Application No. 2018-031661; dated Jan. 28, 2020; 4 pages.

(Continued)

*Primary Examiner* — Basil T. Jos
(74) *Attorney, Agent, or Firm* — Shackelford, Bowen, McKinley & Norton, LLP

(57) ABSTRACT

A robot hand includes a pair of movable members that is detachable from a wrist flange of a robot body and that are arranged at a distance from each other; holding parts that are provided on the movable members and that hold a workpiece; and a width adjusting mechanism that supports the pair of movable members so as to allow relative movement thereof in a width direction and that adjusts a distance B between the pair of movable members by means of the relative movement of the pair of movable members in the width direction (A). The pair of movable members are relatively moved in the width direction as a result of the width adjusting mechanism.

17 Claims, 8 Drawing Sheets

(56) References Cited

FOREIGN PATENT DOCUMENTS

| | | | |
|---|---|---|---|
| JP | 2001-239484 | A | 9/2001 |
| JP | 2002-283263 | A | 10/2002 |
| JP | 3111190 | U | 7/2005 |
| JP | 2006-272526 | A | 10/2006 |
| JP | 2007-210079 | A | 8/2007 |
| JP | 2007-245300 | A | 9/2007 |
| JP | 2008-137107 | A | 6/2008 |
| JP | 4495509 | B2 | 7/2010 |

OTHER PUBLICATIONS

Industrial Property Cooperation Center; Search Report by Registered Search Organization; Japanese Patent Application No. 2018-031661; dated Jan. 10, 2020; 7 pages.

* cited by examiner

ROBOT HAND, ROBOT, AND METHOD FOR ADJUSTING HAND WIDTH OF ROBOT HAND

CROSS-REFERENCE TO RELATED APPLICATIONS

This application is based on Japanese Patent Application No. 2018-031661, the contents of which are incorporated herein by reference.

TECHNICAL FIELD

The present invention relates to a robot hand, a robot, and a method for adjusting the hand width of the robot hand.

BACKGROUND ART

Conventionally, a power source, such as an air cylinder or an electric actuator, has been used to change the hand width of a robot hand (for example, see Japanese Unexamined Patent Application, Publication No. 2008-137107, Japanese Patent No. 4495509, and Japanese Unexamined Patent Application, Publication No. 2006-272526). In Japanese Unexamined Patent Application, Publication No. 2008-137107 and Japanese Patent No. 4495509, the power source is installed in the robot hand. In Japanese Unexamined Patent Application, Publication No. 2006-272526, to reduce the weight of the robot hand, a driving force from a power source, which is independent of the robot hand, is used to change the hand width.

SUMMARY OF INVENTION

A first aspect of the present invention is a robot hand including: a pair of movable members that is detachable from a wrist flange of a robot body and that are arranged at a distance from each other; a holding part that is provided on each of the pair of movable members and that holds a workpiece; and a width adjusting mechanism that supports the pair of movable members so as to allow relative movement thereof in a width direction, which is a direction in which the pair of movable members are arranged, and that adjusts the distance between the pair of movable members by means of relative movement of the pair of movable members in the width direction. The pair of movable members are relatively moved in the width direction as a result of the width adjusting mechanism being controlled by operation of the robot body or as a result of the width adjusting mechanism being controlled by an operator.

In the first aspect above, the width adjusting mechanism may include a lock mechanism that fixes the relative positions of the pair of movable members in the width direction.

In the first aspect above, the lock mechanism may include a knob screw that has a knob controlled by the robot body or the operator and that fixes the pair of movable members with respect to each other.

In the first aspect above, the lock mechanism may include a knob hooking part that is attached to the wrist flange and that is engaged with the knob.

In the first aspect above, the width adjusting mechanism may include a rack provided on one of the pair of movable members and a pinion that is provided on the other of the pair of movable members and that meshes with the rack.

In the first aspect above, the width adjusting mechanism may include a gear that meshes with the pinion and that is rotated by the robot body or the operator.

In the first aspect above, the width adjusting mechanism may include a movable-member hooking part that is attached to the wrist flange and that meshes with a portion of one of the pair of movable members.

A second aspect of the present invention is a robot including: a robot body having a wrist flange; and the robot hand according to the above aspect; and a control unit that controls the robot body. The control unit causes the robot body to perform an operation of relatively moving the pair of movable members in the width direction.

In the above-described second aspect, the control unit may cause the robot body to perform an operation of removing the pair of movable members from the wrist flange and then cause the robot body to perform an operation of relatively moving the pair of movable members in the width direction.

A third aspect of the present invention is a method for adjusting the hand width of the robot hand according to the above aspects, wherein the robot body relatively moves the pair of movable members in the width direction.

In the third aspect, the robot body may remove the pair of movable members from the wrist flange and then relatively move the pair of movable members in the width direction.

DESCRIPTION OF EMBODIMENTS

A robot hand 1, a robot 100, and a method for adjusting the hand width of the robot hand according to an embodiment of the present invention will be described below with reference to the drawings.

The robot 100 according to this embodiment includes a robot body 2, the robot hand 1 attached to the robot body 2, and a control unit 3 for controlling the robot body 2.

Figure 1:
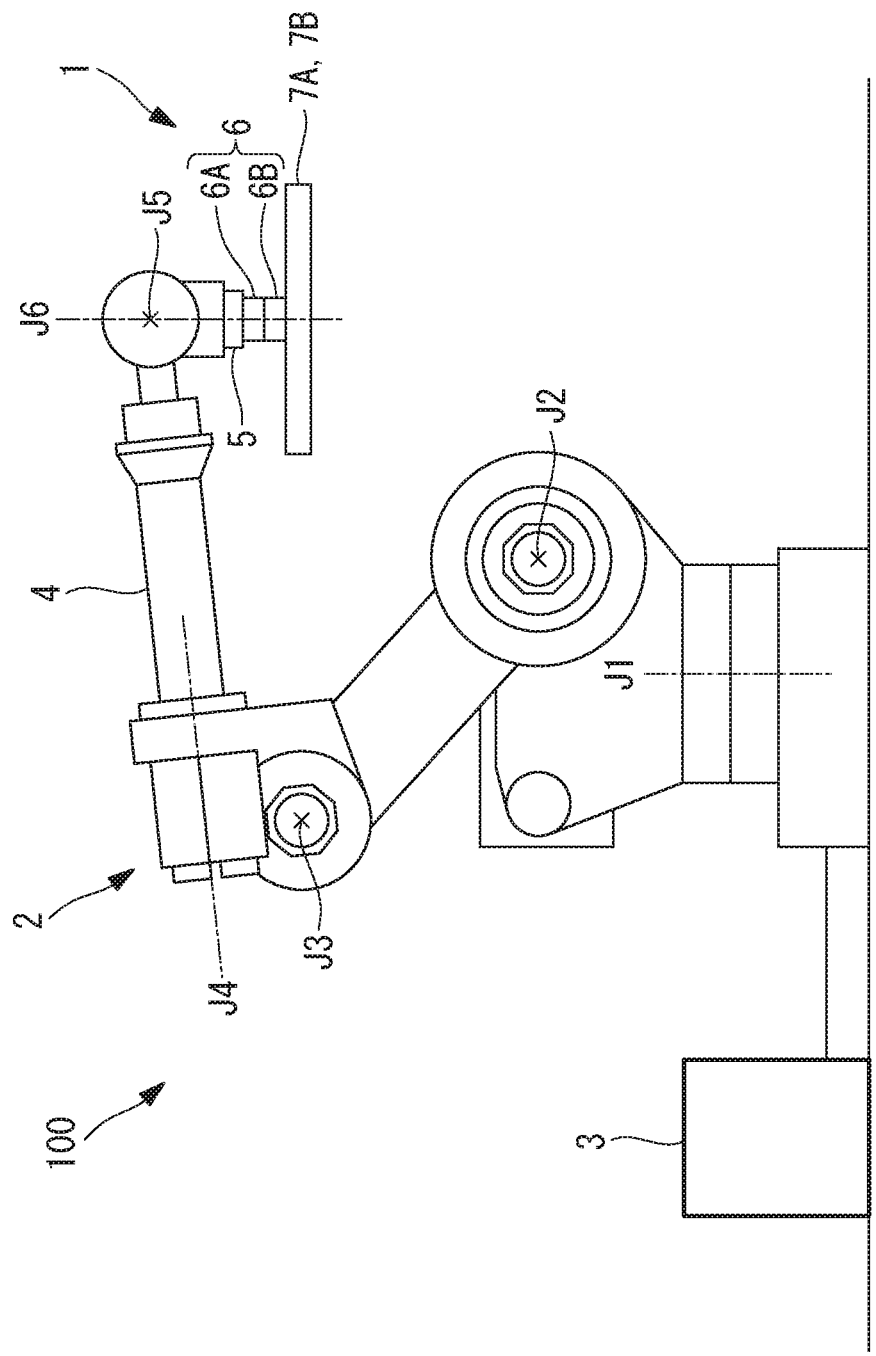
FIG. 1 shows the overall configuration of a robot according to an embodiment of the present invention.

The robot body 2 is a robot that is typically used to transport workpieces W. FIG. 1 shows, as an example, the six-axis articulated robot body 2, which has joint axes J1 to J6. The robot body 2 may be of another type, such as a SCARA robot or a parallel link robot. The robot body 2 has an arm 4. The arm 4 is provided with, at the distal end thereof, a wrist flange 5 to which the robot hand 1 can be attached. The robot body 2 can three-dimensionally move the wrist flange 5 by moving the arm 4.

As shown in FIGS. 1 to 4, the robot hand 1 includes: tool changer 6; a pair of frames (movable members) 7A and 7B, which are arranged at a distance from each other; suction pads (holding parts) 8 and rollers (holding parts) 9, which are provided for each of the pair of frames 7A and 7B and which hold the workpiece W; and a width adjusting mechanism 10 that supports the pair of frames 7A and 7B so as to allow relative movement thereof in the width direction A. The width direction A is a direction in which the pair of frames 7A and 7B are arranged.

The tool changer 6 include a master plate 6A, which is attached to the wrist flange 5 of the robot body 2, and a slave plate 6B, which is detachable from the master plate 6A. The robot body 2 can attach or remove the slave plate 6B to or from the master plate 6A by sending an air pressure or an electric signal to the master plate 6A via an air circuit or an electric circuit (not shown).

Figure 2:
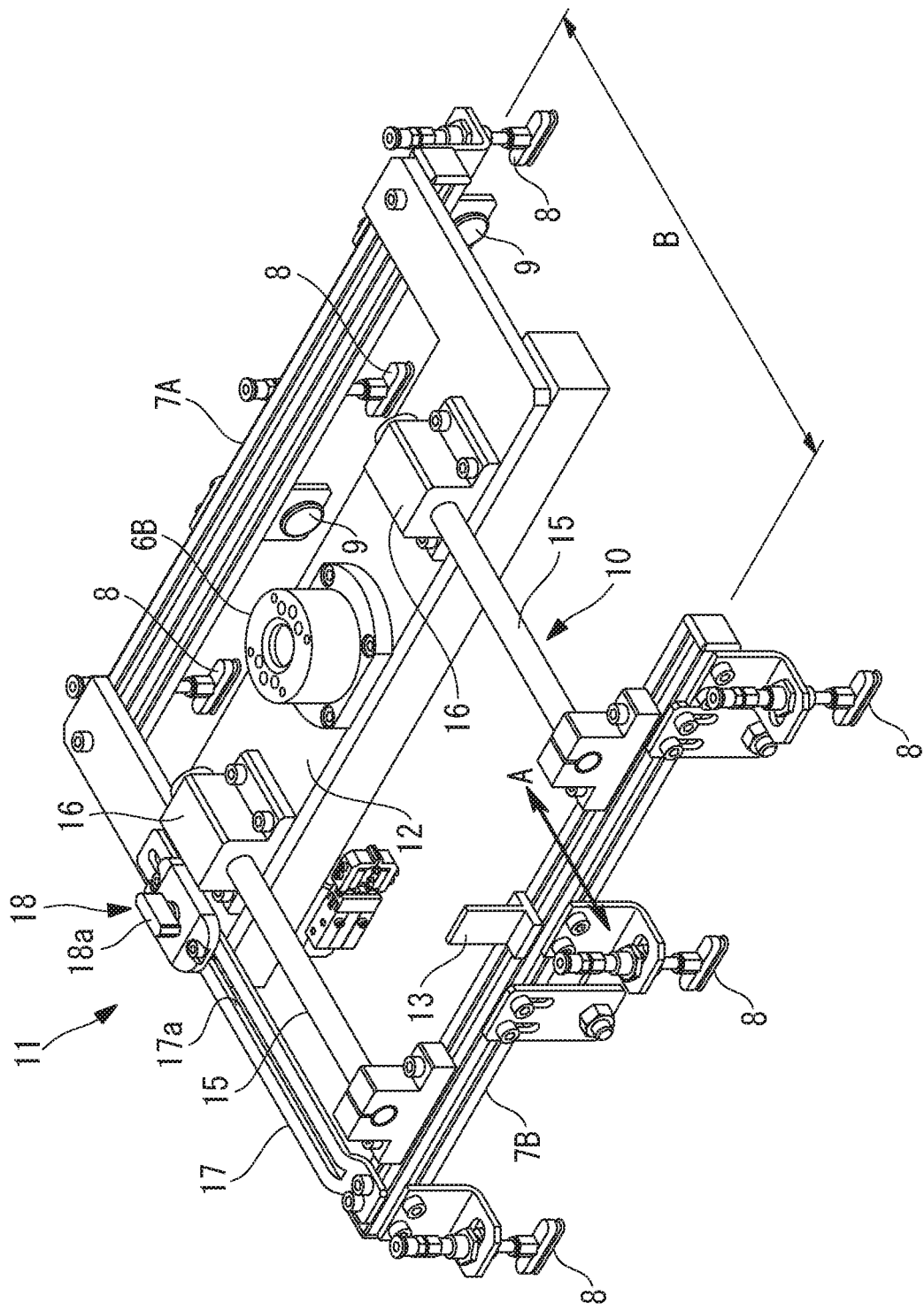
FIG. 2 is a perspective view showing the overall configuration of a slave-side unit of a robot hand according to the embodiment of the present invention.
Figure 3:
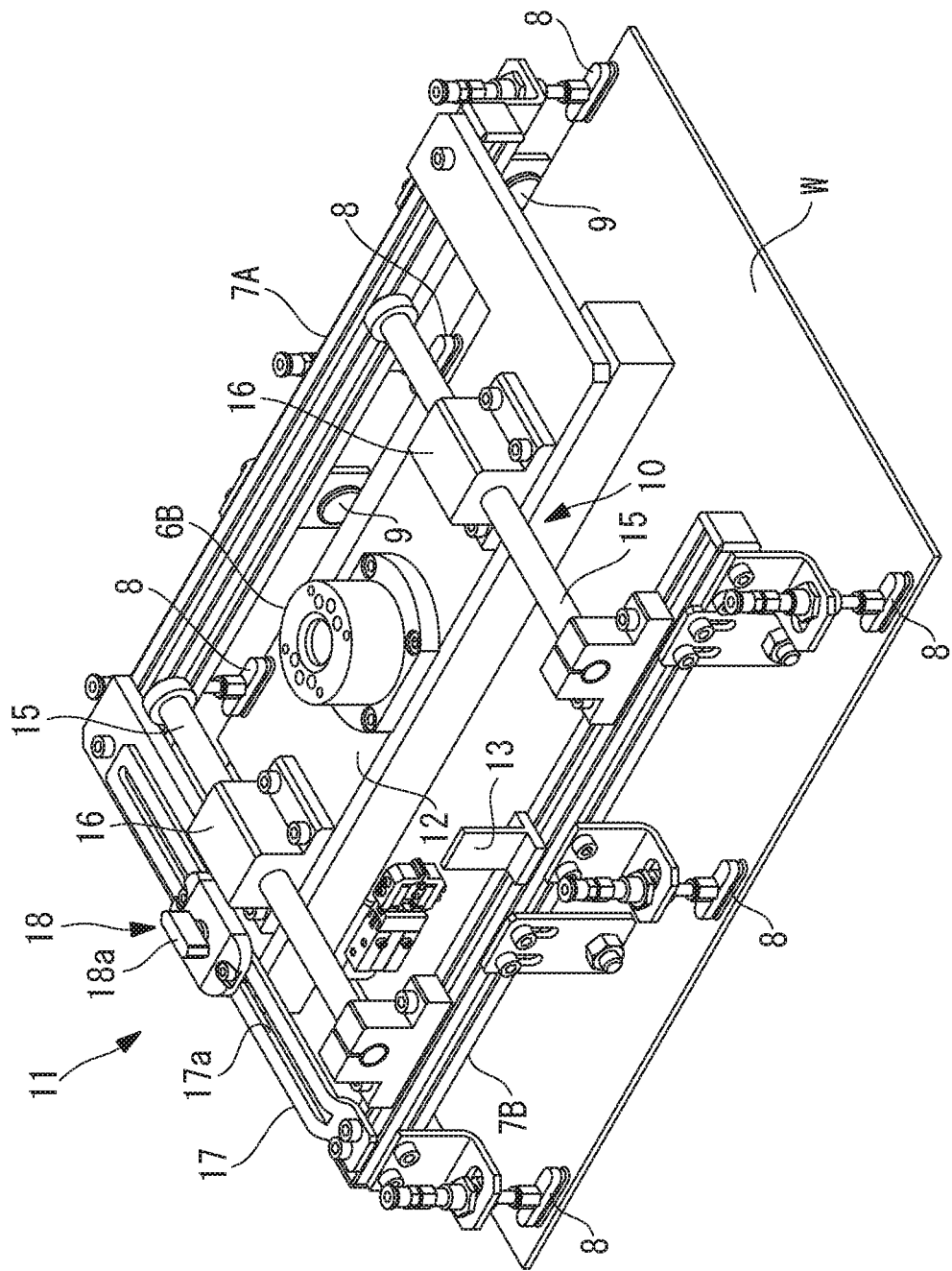
FIG. 3 is a diagram for explaining a method for holding a workpiece with the robot hand in FIG. 1.
Figure 4:
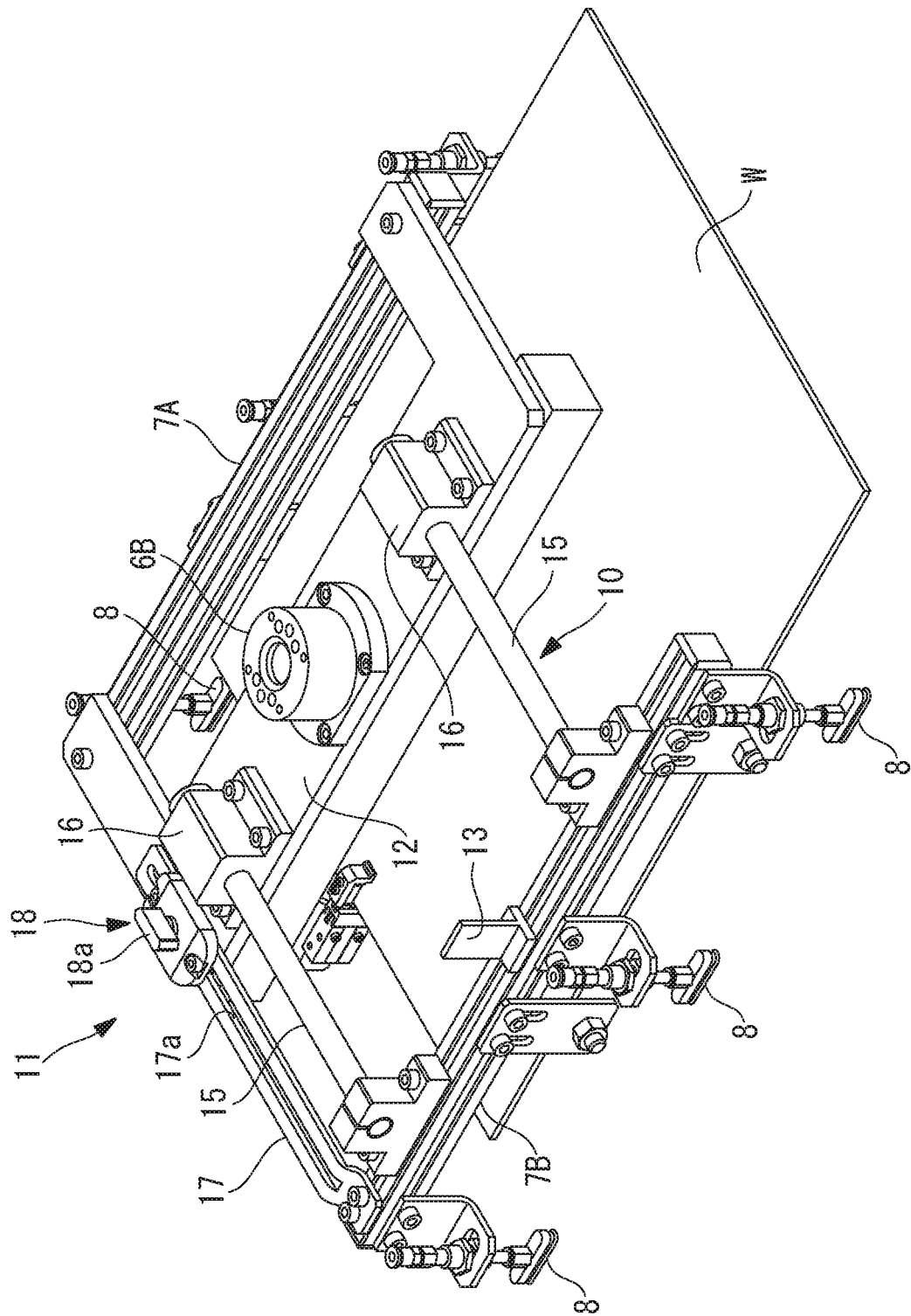
FIG. 4 is a diagram for explaining another method for holding the workpiece with the robot hand in FIG. 1.

As shown in FIGS. 2 to 4, the pair of frames 7A and 7B are linear and are parallel to each other. One frame 7A is a fixed frame that is fixed to the slave plate 6B via a fixed plate 12. The fixed plate 12 is fixed to the slave plate 6B and the fixed frame 7A. The other frame 7B is a movable frame 7B that is supported by the width adjusting mechanism 10 so as to be movable in the width direction A, with respect to the slave plate 6B and the fixed frame 7A.

In a state in which the pair of frames 7A and 7B are attached to the wrist flange 5 via the master plate 6A and the slave plate 6B of the tool changer 6, the width direction A is perpendicular to the central axis (sixth axis J6) of the wrist flange 5. Usually, during the transportation of a workpiece W, the wrist flange 5 is oriented downward, and the pair of frames 7A and 7B are disposed horizontally. Hereinbelow, the side adjacent to the slave plate 6B is defined as the upper side of the frames 7A and 7B, and the side opposite from the slave plate 6B is defined as the lower side of the frames 7A and 7B.

The movable frame 7B has a width adjusting guide 13 projecting upward from the top surface thereof. The width adjusting guide 13 may be a plate-shaped member, as shown in the drawings, or a member having any other shape.

The suction pads 8 are provided on the fixed frame 7A, at a plurality of positions located away from one another in the longitudinal direction. Similarly, the suction pads 8 are provided on the movable frame 7B, at a plurality of positions located away from one another in the longitudinal direction. The suction pads 8 are provided at positions shifted downward from the lower sides of the frames 7A and 7B and, as shown in FIG. 3, adhere to the top surface of the workpiece W disposed below the frames 7A and 7B.

The rollers 9 are provided on the fixed frame 7A, at a plurality of positions located away from one another in the longitudinal direction. Similarly, the rollers 9 are provided on the movable frame 7B, at a plurality of positions located away from one another in the longitudinal direction. Each of the rollers 9 is capable of rotation about a rotation shaft thereof extending in the width direction A and, as shown in FIG. 4, supports the lower side of end portions of a thin, flat workpiece W, such as a printed circuit board. The workpiece W placed on the rollers 9 can slide in the longitudinal direction of the frames 7A and 7B while rotating the rollers 9.

The width adjusting mechanism 10 includes two linear shafts 15 disposed so as to extend in the width direction A and two guide bushings 16 that guide the linear shafts 15 in the longitudinal direction. The two linear shafts 15 are arranged at a distance from each other in the longitudinal direction of the frames 7A and 7B. The linear shafts 15 are fixed to the movable frame 7B at one end. The guide bushings 16 are tube-like members fixed to the fixed plate 12. The linear shafts 15 penetrate through the guide bushings 16 in the longitudinal direction thereof and can smoothly move in the longitudinal direction thereof, with respect to the guide bushings 16. When an external force in the width direction A is applied to the movable frame 7B, the linear shafts 15 smoothly move through the guide bushings 16, allowing the movable frame 7B to move in a direction toward or away from the fixed frame 7A. As a result, the hand width B, which is the distance between the pair of frames 7A and 7B, changes in a stepless manner.

The width adjusting mechanism 10 includes a lock mechanism 11 that fixes the relative positions of the pair of frames 7A and 7B in the width direction A. The lock mechanism 11 includes a guide rail 17 extending between the movable frame 7B and the fixed plate 12 in the width direction A, and a knob screw 18 that fixes the pair of frames 7A and 7B with respect to each other.

The guide rail 17 has a linear slit 17a extending in the width direction A. One end of the guide rail 17 is fixed to the movable frame 7B.

The knob screw 18 includes a male screw (not shown) and a handle part 18a, which is a knob connected to one end of the male screw. The guide rail 17 is sandwiched between the handle part 18a and the fixed plate 12. The male screw of the knob screw 18 penetrates through the slit 17a and is fastened to a female screw formed in the fixed plate 12.

As a result of the knob screw 18 being rotated in a tightening direction (locking direction), the guide rail 17 is fixed with respect to the fixed plate 12, fixing the movable frame 7B with respect to the fixed frame 7A. Thus, the hand width B is maintained constant.

On the other hand, as a result of the knob screw 18 being rotated in a loosening direction (unlocking direction), fixing of the guide rail 17 with respect to the fixed plate 12 is released. As a result, the movable frame 7B becomes movable with respect to the fixed frame 7A, thus making it possible to change the hand width B. In a state in which the fixing is released, the guide rail 17 smoothly moves in the longitudinal direction, with respect to the knob screw 18, together with the linear shafts 15. Hence, it is possible to fix the pair of frames 7A and 7B at desired relative positions, with respect to each other, with the knob screw 18, thus making it possible to maintain the hand width B at a desired width.

Figure 5:
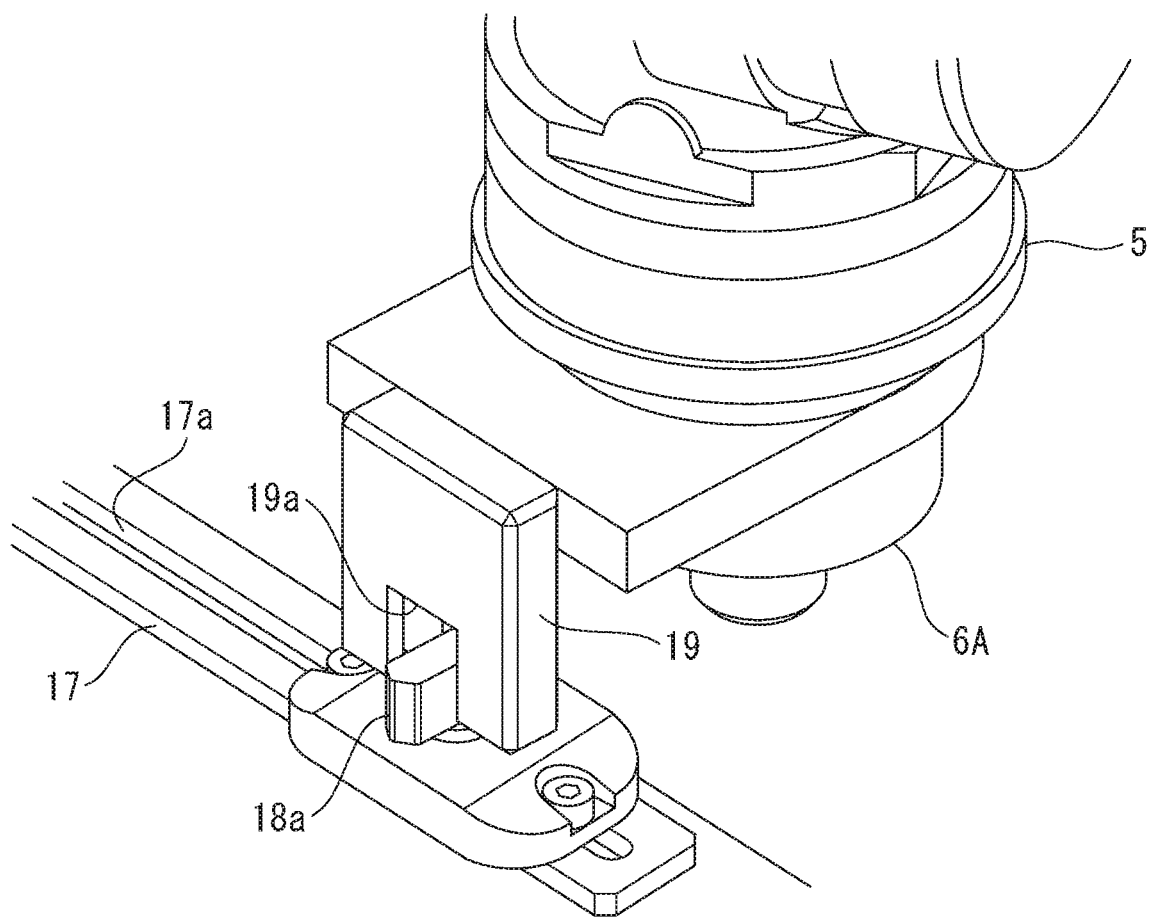
FIG. 5 is a diagram for explaining operations of fixing and unfixing the pair of frames, performed by the robot body in FIG. 1.
Figure 6:
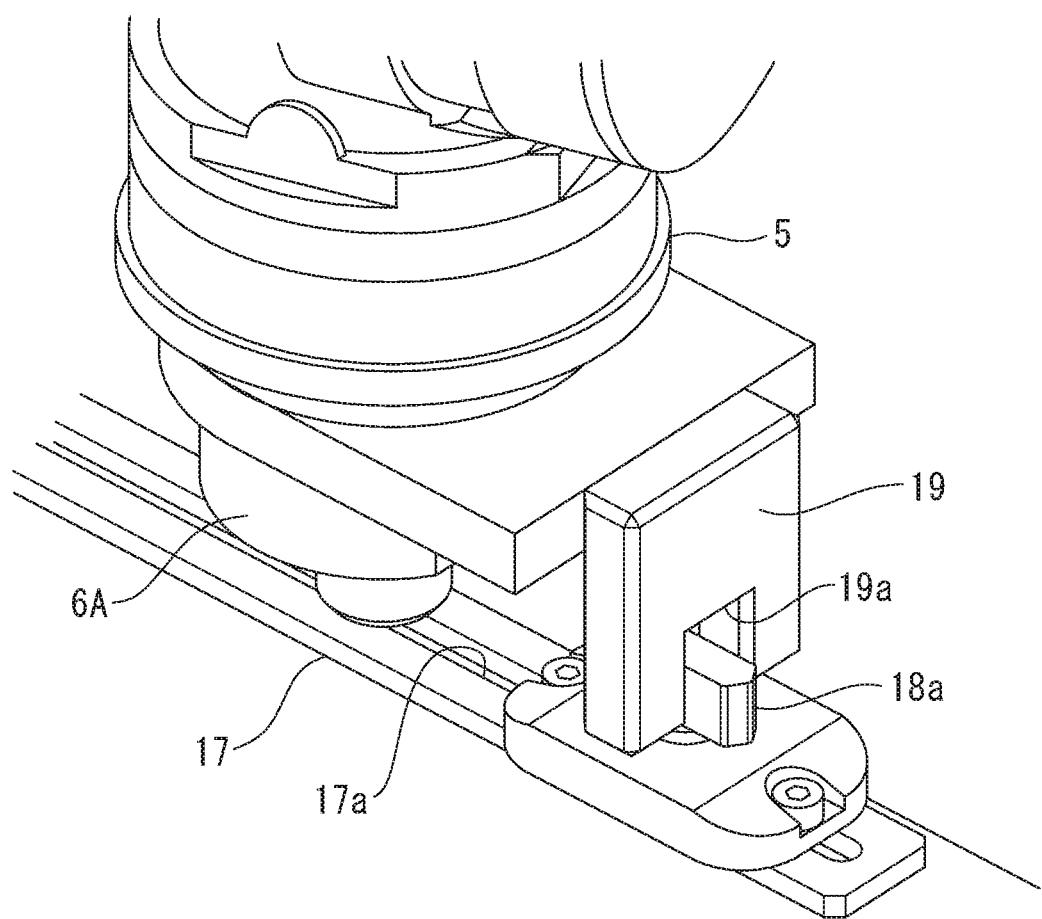
FIG. 6 is a diagram for explaining operations of fixing and unfixing the pair of frames, performed by the robot body in FIG. 1.

As shown in FIGS. 5 and 6, the width adjusting mechanism 10 further includes a knob 18a and a hooking part (knob hooking part, movable-member hooking part) 19 for controlling the width adjusting guide 13. The hooking part 19 has a recess 19a that engages with both the width adjusting guide 13 and the handle part 18a. The hooking part 19 is attached to the wrist flange 5 of the robot body 2.

As described above, the robot hand 1 includes a master-side unit, which includes the master plate 6A and the hooking part 19 and which is constantly attached to the wrist flange 5 during the operation of the robot body 2, and a slave-side unit, which includes the slave plate 6B, the frames 7A and 7B, and the width adjusting mechanism 10 and which is detachable from the wrist flange 5 as necessary during the operation of the robot body 2.

The control unit 3 includes a storage unit (not shown) and a processor (not shown). The storage unit stores a hand-width adjusting program for causing the robot body 2 to perform an operation of adjusting the hand width B of the robot hand 1. By controlling the robot body 2 in accordance with the hand-width adjusting program, the processor automatically performs adjustment of the hand width B in accordance with the width of the workpiece W to be held.

Next, a hand-width adjusting operation (hand-width adjusting method) performed by the robot body 2 will be described.

First, the robot body 2 places the slave-side unit, which is attached to the wrist flange 5, at a predetermined place and separates the slave plate 6B from the master plate 6A to remove the slave-side unit from the wrist flange 5.

Next, by moving the arm 4, the robot body 2 engages the hooking part 19 of the wrist flange 5 with the handle part 18*a*, as shown in FIG. 5. Then, by moving the arm 4, the robot body 2 rotates the wrist flange 5 about the hooking part 19, in the unlocking direction, as shown in FIG. 6. As a result, the handle part 18*a* and the knob screw 18 are rotated in the unlocking direction, releasing the fixing of the movable frame 7B with respect to the fixed frame 7A.

Figure 7:
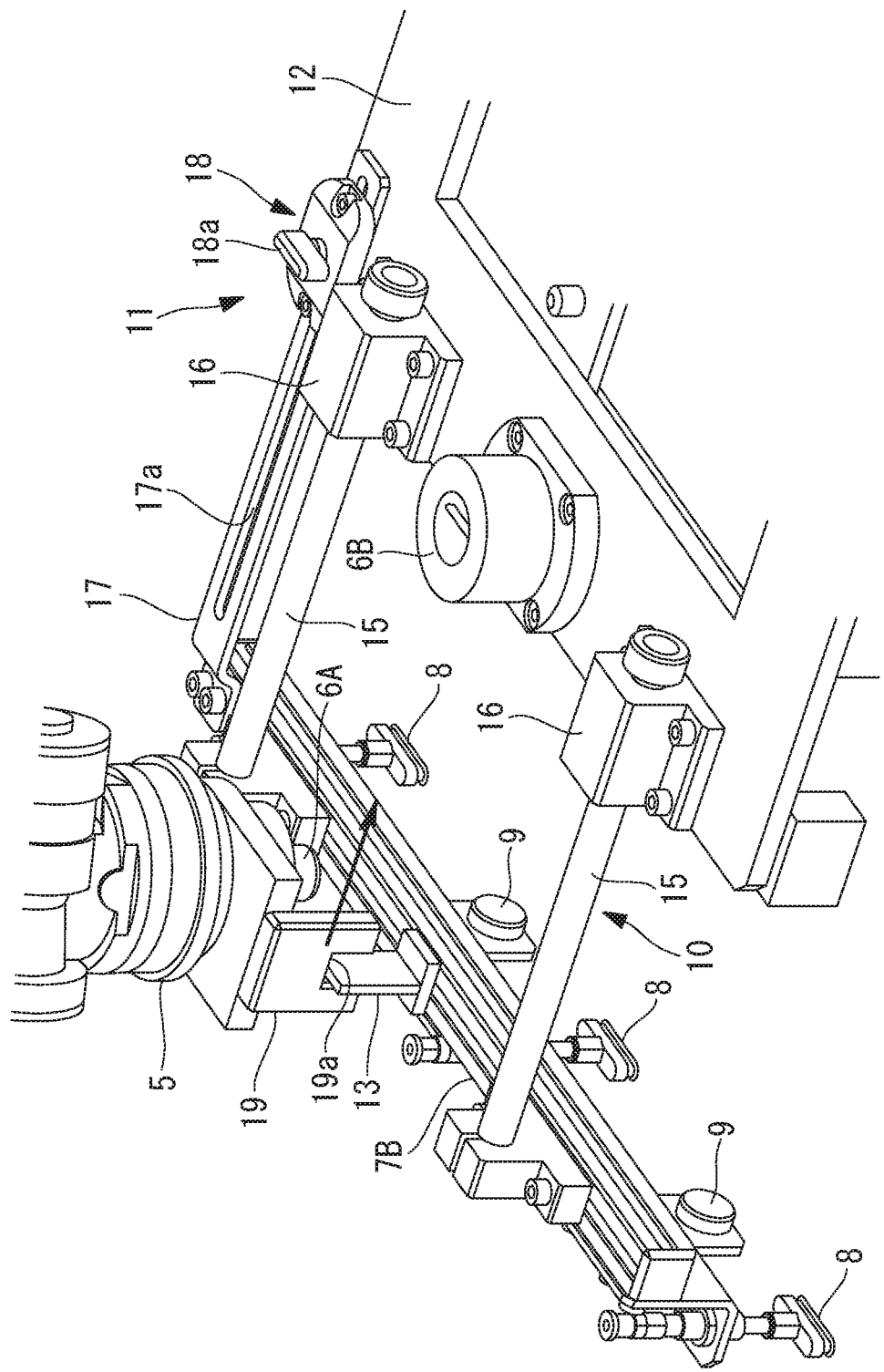
FIG. 7 is a diagram for explaining a hand-width adjusting operation performed by the robot body in FIG. 1.
Figure 8:
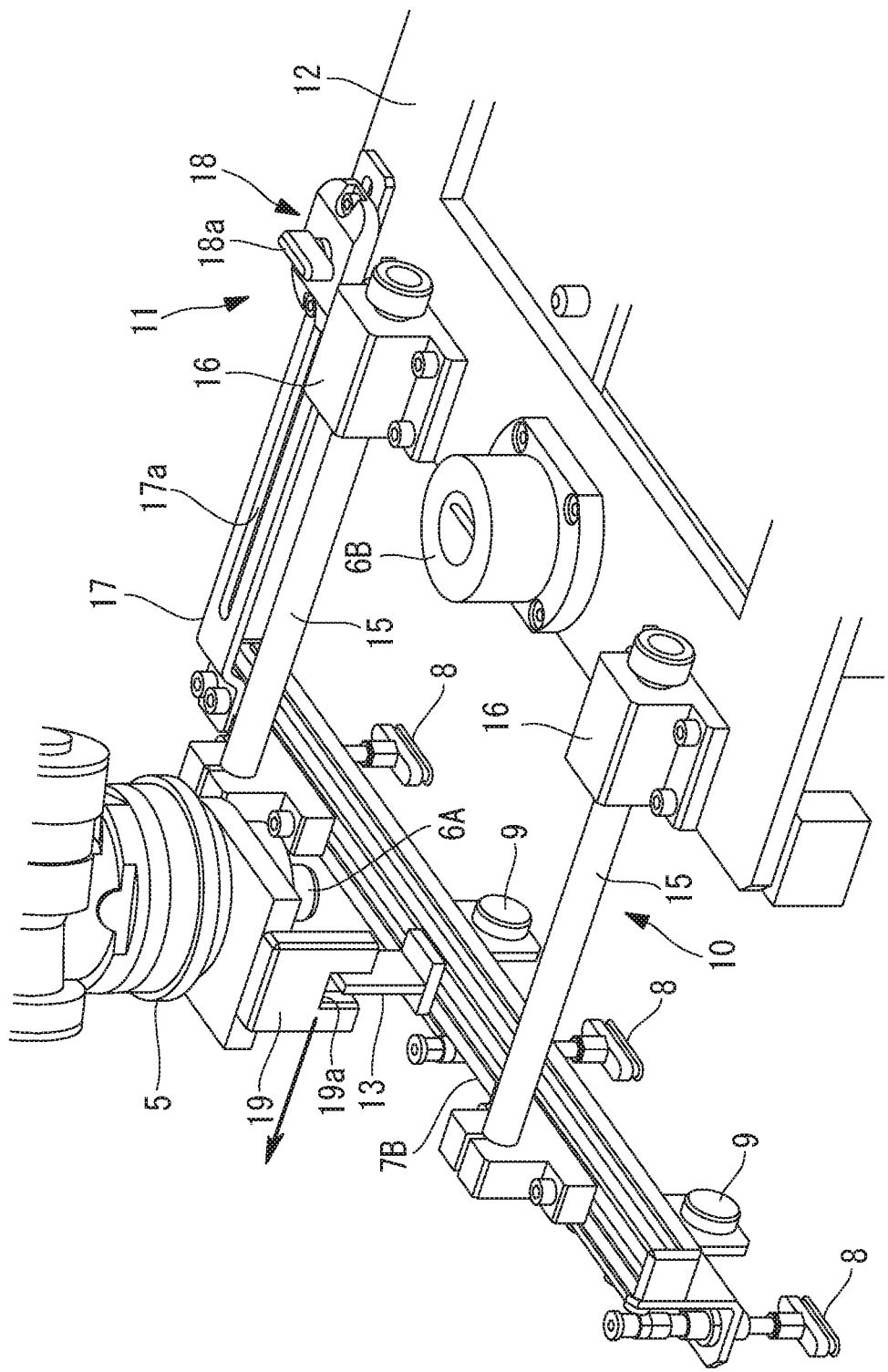
FIG. 8 is a diagram for explaining a hand-width adjusting operation performed by the robot body in FIG. 1.

Next, by moving the arm 4, the robot body 2 engages the hooking part 19 with the width adjusting guide 13. Then, by moving the arm 4, the robot body 2 linearly moves the wrist flange 5 in the width direction A, as shown in FIGS. 7 and 8. As a result, the width adjusting guide 13 and the movable frame 7B move linearly in the width direction A with respect to the fixed frame 7A, changing the hand width B. The amount by which the hand width B is changed is controlled by the amount by which the wrist flange 5 moves in the width direction A. FIG. 7 shows a case where the movable frame 7B is moved toward the fixed frame 7A. FIG. 8 shows a case where the movable frame 7B is moved away from the fixed frame 7A.

Next, by moving the arm 4, the robot body 2 engages the hooking part 19 of the wrist flange 5 with the handle part 18*a* again, as shown in FIG. 6. Then, by moving the arm 4, the robot body 2 rotates the wrist flange 5 about the hooking part 19 in the locking direction, as shown in FIG. 5. As a result, the handle part 18*a* and the knob screw 18 are rotated in the locking direction, fixing the movable frame 7B with respect to the fixed frame 7A again. Thus, the hand width B is maintained constant.

As described above, according to this embodiment, the pair of frames 7A and 7B are configured to move relatively in the width direction A, as a result of the width adjusting mechanism 10 being controlled by the operation of the robot body 2. The relative positions of the pair of frames 7A and 7B are fixed and unfixed as a result of the lock mechanism 11 being controlled by the operation of the robot body 2. Specifically, the robot hand 1 is not provided with a power source, such as an air cylinder or an electric actuator, which is used to adjust the hand width B. Hence, it is possible to reduce the weight of the robot hand 1. Because a structure, such as a wiring line, for transmitting the driving force for adjusting the hand width B is unnecessary in the slave-side unit of the robot hand 1, the structure can be simplified.

As a result of the control unit 3 controlling the robot body 2, the adjustment of the hand width B is automatically performed. In other words, there is no need for an operator to adjust the hand width B. Hence, unattended operation is possible even in a case where various workpieces W having different sizes are transported by using the same robot hand 1. This is especially advantageous in unattended continuous operation, such as all-night operation.

In this embodiment, the width adjusting mechanism 10 may have a means that prohibits movement of the movable frame 7B in the width direction A when a force in the width direction A, applied to the movable frame 7B, is less than a predetermined threshold and that allows movement of the movable frame 7B in the width direction A when the force in the width direction A, applied to the movable frame 7B, is larger than or equal to the predetermined threshold. The provision of such a means can prevent unwanted movement of the movable frame 7B due to shaking or the like.

For example, this means may be the friction between the outer circumferential surfaces of the linear shafts 15 and the inner circumferential surfaces of the guide bushings 16.

Alternatively, this means may have a rack provided on one of the pair of frames 7A and 7B and a pinion that is provided on the other of the pair of frames 7A and 7B and that meshes with the rack. The rack is fixed to, for example, the movable frame 7B and moves in the width direction A as the movable frame 7B moves. The rack may be provided on one of the linear shafts 15. The pinion is fixed to, for example, the fixed frame 7A. The hand width B can be adjusted by the pitch of the teeth of the rack.

When the force in the width direction A, applied to the movable frame 7B, is less than the predetermined threshold, the rack and the pinion also function as a lock mechanism that fixes the movable frame 7B with respect to the fixed frame 7A.

The width adjusting mechanism 10 may further include a gear that meshes with the pinion. When the robot body 2 rotates the gear using a certain tool, such as an electric screwdriver or a nut runner, the rotation of the gear is transmitted to the pinion, and the rotation of the pinion moves the rack and the movable frame 7B in the width direction A. The amount by which the movable frame 7B is moved is controlled by the number of rotations of the gear. The tool for rotating the gear may be attached to the wrist flange 5, similarly to the hooking part 19, or may be attachable to and removable from the wrist flange 5 via another slave plate. The system may be configured such that the rotation of the gear is decelerated by the pinion to prevent the gear from unintentionally rotating in situations other than the situation in which the gear is rotated by the robot body 2.

In this embodiment, the hooking part 19 is attached to the wrist flange 5 of the robot body 2. Alternatively, the hooking part 19 may be provided independently of the robot body 2. For example, the hooking part 19 may be fixed to a peripheral part of the robot body 2.

In this case, the rotation of the handle part 18*a* and the adjustment of the hand width B are performed in a state in which the slave-side unit is attached to the wrist flange 5.

More specifically, in a state in which the slave-side unit is attached to the wrist flange 5, the robot body 2 moves the arm 4 to engage the handle part 18*a* with the hooking part 19 and then rotates the wrist flange 5 about the hooking part 19 and the handle part 18*a* in the unlocking direction. As a result, fixing of the movable frame 7B with respect to the fixed frame 7A is released.

Next, the robot body 2 moves the arm 4 to engage the width adjusting guide 13 with the hooking part 19 and then moves the wrist flange 5 linearly in the width direction A to adjust the hand width B.

Then, the robot body 2 moves the arm 4 to engage the handle part 18*a* with the hooking part 19 again and then rotates the wrist flange 5 about the hooking part 19 and the handle part 18*a* in the locking direction. As a result, the movable frame 7B is fixed with respect to the fixed frame 7A.

In the case where the width adjusting mechanism 10 has the gear, a tool, such as a screwdriver or a nut runner, may be fixed to a peripheral part of the robot body 2. In this case, by moving the arm 4 in a state in which the slave-side unit is attached to the wrist flange 5, the robot body 2 can fit the tool into the gear, and then, by rotating the wrist flange 5 about the gear, the robot body 2 can adjust the hand width B.

In this embodiment, the common hooking part 19 is used for the handle part 18a and the width adjusting guide 13. Alternatively, a hooking part used solely for the handle part 18a and a hooking part used solely for the width adjusting guide 13 may be provided.

In this embodiment, although the movable frame 7B has the width adjusting guide 13, the width adjusting guide 13 does not necessarily have to be provided. In that case, the hooking part 19 may be engaged with a portion of the movable frame 7B or another structure fixed to the movable frame 7B.

In this embodiment, the lock mechanism 11 has the knob screw 18, serving as a means for fixing the relative positions of the pair of frames 7A and 7B. Alternatively, the lock mechanism 11 may have another means. For example, the lock mechanism 11 may have a push-button switch, and the pair of frames 7A and 7B may be fixed and unfixed as a result of the robot body 2 pressing the push-button switch.

In this embodiment, only one of the pair of frames 7A and 7B is movable in the width direction A. Alternatively, both of the frames 7A and 7B may be movable in the width direction A. By moving the pair of frames 7A and 7B substantially symmetrically in the width direction A, with respect to the master plate 6A and the slave plate 6B of the tool changer 6, it is possible to stabilize the position of the center of gravity of the entirety of the robot hand 1.

Another pair of frames capable of relative movement in the longitudinal direction of the pair of frames 7A and 7B may be provided. Specifically, four frames may be disposed so as to form a rectangle, so that the hand width B can be adjusted in two directions perpendicular to each other.

Although the suction pads 8 and the rollers 9, serving as the holding parts for holding the workpiece W, are provided in this embodiment, the type of the holding parts may be appropriately changed in accordance with the workpiece W to be held. For example, magnets, hooks, or chuck claws for an outside-diameter chuck or an inside-diameter chucks may be employed as the holding parts.

In this embodiment, the robot body 2 controls the movable frame 7B to adjust the hand width B. Alternatively, an operator may adjust the hand width B by manually controlling the movable frame 7B.

In this embodiment, the robot body 2 controls the lock mechanism 11 to fix and unfix the movable frame 7B. Alternatively, an operator may manually control the lock mechanism 11 to fix and unfix the movable frame 7B.

In this embodiment, a robot that is different from the robot body 2, to which the robot hand 1 is attached, may move the movable frame 7B and control the lock mechanism 11.

As a result, the following aspect is read from the above described embodiment of the present invention.

To achieve the above-described object, the present invention provides the following solutions.

A first aspect of the present invention is a robot hand including: a pair of movable members that is detachable from a wrist flange of a robot body and that are arranged at a distance from each other; a holding part that is provided on each of the pair of movable members and that holds a workpiece; and a width adjusting mechanism that supports the pair of movable members so as to allow relative movement thereof in a width direction, which is a direction in which the pair of movable members are arranged, and that adjusts the distance between the pair of movable members by means of relative movement of the pair of movable members in the width direction. The pair of movable members are relatively moved in the width direction as a result of the width adjusting mechanism being controlled by operation of the robot body or as a result of the width adjusting mechanism being controlled by an operator.

According to this aspect, a pair of movable members are arranged at a distance from each other. Hence, it is possible to stably hold a workpiece by using the holding parts provided on the movable members. The hand width, which is the distance between the pair of movable members, can be adjusted by the width adjusting mechanism. Hence, by adjusting the hand width according to the width of the workpiece, it is possible to hold workpieces having various dimensions with the holding parts.

In this case, a power source is unnecessary because the pair of movable members are relatively moved by the robot body or the operator controlling the width adjusting mechanism instead of using a power source, such as an air cylinder or an electric actuator. This makes it possible to reduce the weight of the robot hand and to simplify the structure.

In the first aspect above, the width adjusting mechanism may include a lock mechanism that fixes the relative positions of the pair of movable members in the width direction.

By fixing the relative positions of the pair of movable members by means of the lock mechanism in situations other than the situation in which the hand width is adjusted, it is possible to prevent the pair of movable members from unintentionally moving, thus unintentionally changing the hand width.

In the first aspect above, the lock mechanism may include a knob screw that has a knob controlled by the robot body or the operator and that fixes the pair of movable members with respect to each other.

The robot body or the operator can fix the pair of movable members relative to each other by rotating the knob in the direction in which the knob screw is fastened (locking direction). The robot body or the operator can release the fixing of the pair of movable members by rotating the knob in the direction in which the knob screw is loosened (unlocking direction). In this way, the pair of movable members can be fixed and unfixed with a simple operation.

In the first aspect above, the lock mechanism may include a knob hooking part that is attached to the wrist flange and that is engaged with the knob.

With this configuration, it is possible to rotate the knob by operation of the robot body. Specifically, in a state in which the pair of movable members are removed from the wrist flange, the robot body can rotate the knob by engaging the knob hooking part, which is attached to the wrist flange, with the knob and then rotating the wrist flange about the knob hooking part.

In the first aspect above, the width adjusting mechanism may include a rack provided on one of the pair of movable members and a pinion that is provided on the other of the pair of movable members and that meshes with the rack.

With this configuration, only when a force in the width direction that is greater than or equal to the predetermined threshold is applied to the pair of movable members, does the rack move while rotating the pinion, allowing the pair of movable members to move relatively.

In the first aspect above, the width adjusting mechanism may include a gear that meshes with the pinion and that is rotated by the robot body or the operator.

When the gear rotates, the rotation of the gear is transmitted to the pinion. The rotation of the pinion moves the rack in the width direction. The movement of the rack relatively moves the pair of movable members in the width direction. That is, the robot body or the operator can adjust the hand width by rotating the gear. The amount by which the hand width is adjusted can be precisely controlled by the number of rotations of the gear.

In the first aspect above, the width adjusting mechanism may include a movable-member hooking part that is attached to the wrist flange and that meshes with a portion of one of the pair of movable members.

With this configuration, by the operation of the robot body, it is possible to move one of the movable members in the width direction to adjust the hand width. Specifically, in a state in which the pair of movable members are removed from the wrist flange, the robot body can move one of the movable members by engaging the movable-member hooking part, which is attached to the wrist flange, with a portion of the one of the movable members and moving the wrist flange in the width direction.

A second aspect of the present invention is a robot including: a robot body having a wrist flange; and the robot hand according to the above aspect; and a control unit that controls the robot body. The control unit causes the robot body to perform an operation of relatively moving the pair of movable members in the width direction.

In the above-described second aspect, the control unit may cause the robot body to perform an operation of removing the pair of movable members from the wrist flange and then cause the robot body to perform an operation of relatively moving the pair of movable members in the width direction.

A third aspect of the present invention is a method for adjusting the hand width of the robot hand according to the above aspects, wherein the robot body relatively moves the pair of movable members in the width direction.

In the third aspect, the robot body may remove the pair of movable members from the wrist flange and then relatively move the pair of movable members in the width direction.

REFERENCE SIGNS LIST

1 robot hand
2 robot body
3 control unit
4 arm
5 wrist flange
6 tool changer
7A, 7B frame (movable member)
8 suction pad (holding part)
9 roller (holding part)
10 width adjusting mechanism
11 lock mechanism
12 fixed plate
13 width adjusting guide
15 linear shaft
16 guide bushing
17 guide rail
18 knob screw
18a handle part
19 hooking part (knob hooking part, movable-member hooking part)
19a recess
100 robot

The invention claimed is:

1. A robot hand comprising:
a pair of movable members that is detachable from a wrist flange of a robot body and that are arranged at a distance from each other;
a holding part that is provided on each of the pair of movable members and that holds a workpiece;
a width adjusting mechanism that supports the pair of movable members so as to allow relative movement thereof in a width direction, which is a direction in which the pair of movable members are arranged, and that adjusts the distance between the pair of movable members via the relative movement of the pair of movable members in the width direction;
wherein the pair of movable members are relatively moved in the width direction as a result of the width adjusting mechanism being controlled by the operation of the robot body or as a result of the width adjusting mechanism being controlled by an operator; and
wherein the width adjusting mechanism comprises a lock mechanism that includes a knob screw that has a knob controlled by the robot body or the operator and that fixes the pair of movable members with respect to each other.

2. The robot hand according to claim 1, wherein the lock mechanism fixes relative positions of the pair of movable members in the width direction.

3. The robot hand according to claim 2, wherein the width adjusting mechanism includes a rack provided on one of the pair of movable members and a pinion that is provided on the other of the pair of movable members and that meshes with the rack.

4. The robot hand according to claim 3, wherein the width adjusting mechanism includes a gear that meshes with the pinion and that is rotated by the robot body or the operator.

5. The robot hand according to claim 1, wherein the lock mechanism includes a knob hooking part that is attached to the wrist flange and that is engaged with the knob.

6. The robot hand according to claim 1, wherein the width adjusting mechanism includes a movable-member hooking part that is attached to the wrist flange and that meshes with a portion of one of the pair of movable members.

7. A robot comprising:
a robot body having a wrist flange; and
the robot hand according to claim 1; and
a control unit that controls the robot body,
wherein the control unit causes the robot body to perform an operation of relatively moving the pair of movable members in the width direction.

8. The robot according to claim 7, wherein the control unit causes the robot body to perform an operation of removing the pair of movable members from the wrist flange and then causes the robot body to perform an operation of relatively moving the pair of movable members in the width direction.

9. A method for adjusting the hand width of the robot hand according to claim 1, wherein the robot body relatively moves the pair of movable members in the width direction.

10. The method according to claim 9, wherein the robot body removes the pair of movable members from the wrist flange and then relatively moves the pair of movable members in the width direction.

11. A robot hand comprising:
a pair of movable members that is detachable from a wrist flange of a robot body and that are arranged at a distance from each other;
a holding part that is provided on each of the pair of movable members and that holds a workpiece;
a width adjusting mechanism that supports the pair of movable members so as to allow relative movement thereof in a width direction, which is a direction in which the pair of movable members are arranged, and that adjusts the distance between the pair of movable members via the relative movement of the pair of movable members in the width direction;

wherein the pair of movable members are relatively moved in the width direction as a result of the width adjusting mechanism being controlled by the operation of the robot body or as a result of the width adjusting mechanism being controlled by an operator; and wherein the width adjusting mechanism comprises a movable-member hooking part that is attached to the wrist flange and that meshes with a portion of one of the pair of movable members.

12. The robot hand according to claim 11, wherein the width adjusting mechanism comprises a lock mechanism that fixes relative positions of the pair of movable members in the width direction.

13. The robot hand according to claim 12, wherein the lock mechanism comprises a knob screw that has a knob controlled by the robot body or the operator and that fixes the pair of movable members with respect to each other.

14. The robot hand according to claim 13, wherein the lock mechanism comprises a knob hooking part that is attached to the wrist flange and that is engaged with the knob.

15. The robot hand according to claim 12, wherein the width adjusting mechanism comprises a rack provided on one of the pair of movable members and a pinion that is provided on the other of the pair of movable members and that meshes with the rack.

16. The robot hand according to claim 15, wherein the width adjusting mechanism comprises a gear that meshes with the pinion and that is rotated by the robot body or the operator.

17. A robot comprising:

a robot body having a wrist flange;

a robot hand, the robot hand comprising:

a pair of movable members that is detachable from a wrist flange of a robot body and that are arranged at a distance from each other;

a holding part that is provided on each of the pair of movable members and that holds a workpiece;

a width adjusting mechanism that supports the pair of movable members so as to allow relative movement thereof in a width direction, which is a direction in which the pair of movable members are arranged, and that adjusts the distance between the pair of movable members via the relative movement of the pair of movable members in the width direction; and wherein the pair of movable members are relatively moved in the width direction as a result of the width adjusting mechanism being controlled by the operation of the robot body or as a result of the width adjusting mechanism being controlled by an operator;

a control unit that controls the robot body; and wherein the control unit causes the robot body to perform an operation of removing the pair of movable members from the wrist flange and causes the robot body to perform an operation of relatively moving the pair of movable members in the width direction.

* * * * *